United States Patent [19]
Matsumura et al.

[11] Patent Number: 5,579,981
[45] Date of Patent: Dec. 3, 1996

[54] REFLOW APPARATUS

[75] Inventors: Nobuya Matsumura, Kyoto; Kazumi Ishimoto; Yoichi Nakamura, both of Katano; Kurayasu Hamasaki, Moriguchi; Kimihito Kuwabara, Osaka; Masahiro Taniguchi, Hirakata, all of Japan

[73] Assignee: Matsushita Electric Industrial Co., Ltd., Osaka-fu, Japan

[21] Appl. No.: 371,776

[22] Filed: Jan. 12, 1995

[30] Foreign Application Priority Data

Jan. 13, 1994 [JP] Japan .................................. 6-002028

[51] Int. Cl.[6] .................................................. B23K 1/012
[52] U.S. Cl. ........................... 228/19; 228/42; 219/201; 219/388; 219/522; 219/526
[58] Field of Search .................................. 228/219, 232, 228/234.1, 19, 42; 219/201, 388, 428, 522, 526

[56] References Cited

U.S. PATENT DOCUMENTS

| | | | |
|---|---|---|---|
| 5,147,083 | 9/1992 | Halstead et al. | 228/42 |
| 5,176,307 | 1/1993 | Hagerty et al. | 228/42 |
| 5,425,492 | 6/1995 | Thode | 228/42 |

FOREIGN PATENT DOCUMENTS

441070  2/1992  Japan ........................................ 228/42

Primary Examiner—Samuel M. Heinrich
Attorney, Agent, or Firm—Wenderoth, Lind & Ponack

[57] ABSTRACT

A reflow apparatus includes a reflow furnace. A transfer device holds and transfers printed circuit boards with to-be-reflowed electronic components thereon from an inlet to an outlet of the furnace within the furnace. A plurality of adjusting/circulating sections separate an ambient gas for heating the printed circuit boards into predetermined temperature regions in the furnace in which the ambient gas is circulated in a heated state. A feed port is formed in the furnace to feed the ambient gas into the furnace under pressure. Residence parts each provided between adjacent adjusting/circulating sections regulate the amount of the ambient gas when the ambient gas, after having been sent to and heated in the adjusting/circulating section adjacent to the feed port, is circulated and sequentially moved to the adjusting/circulating sections at the inlet or the outlet and finally flows out through the inlet or outlet into atmosphere. Suction ports are open to the furnace to suck the ambient gas from the inside of the furnace. A flux removing unit is separate from the furnace and removes components of a flux from the ambient gas sucked through the suction ports from the inside of the furnace.

20 Claims, 10 Drawing Sheets

REFLOW APPARATUS

BACKGROUND OF THE INVENTION

The present invention relates to a reflow apparatus for soldering and mounting electronic components to printed circuit boards.

Conventionally, ambient gas for heating or cooling printed circuit boards is separated for every predetermined temperature in a furnace of a reflow apparatus. The separated gas, while heated or cooled, is circulated in the furnace, thereby heating the printed circuit boards and melting the solder to solder the electronic components.

Figure 9:
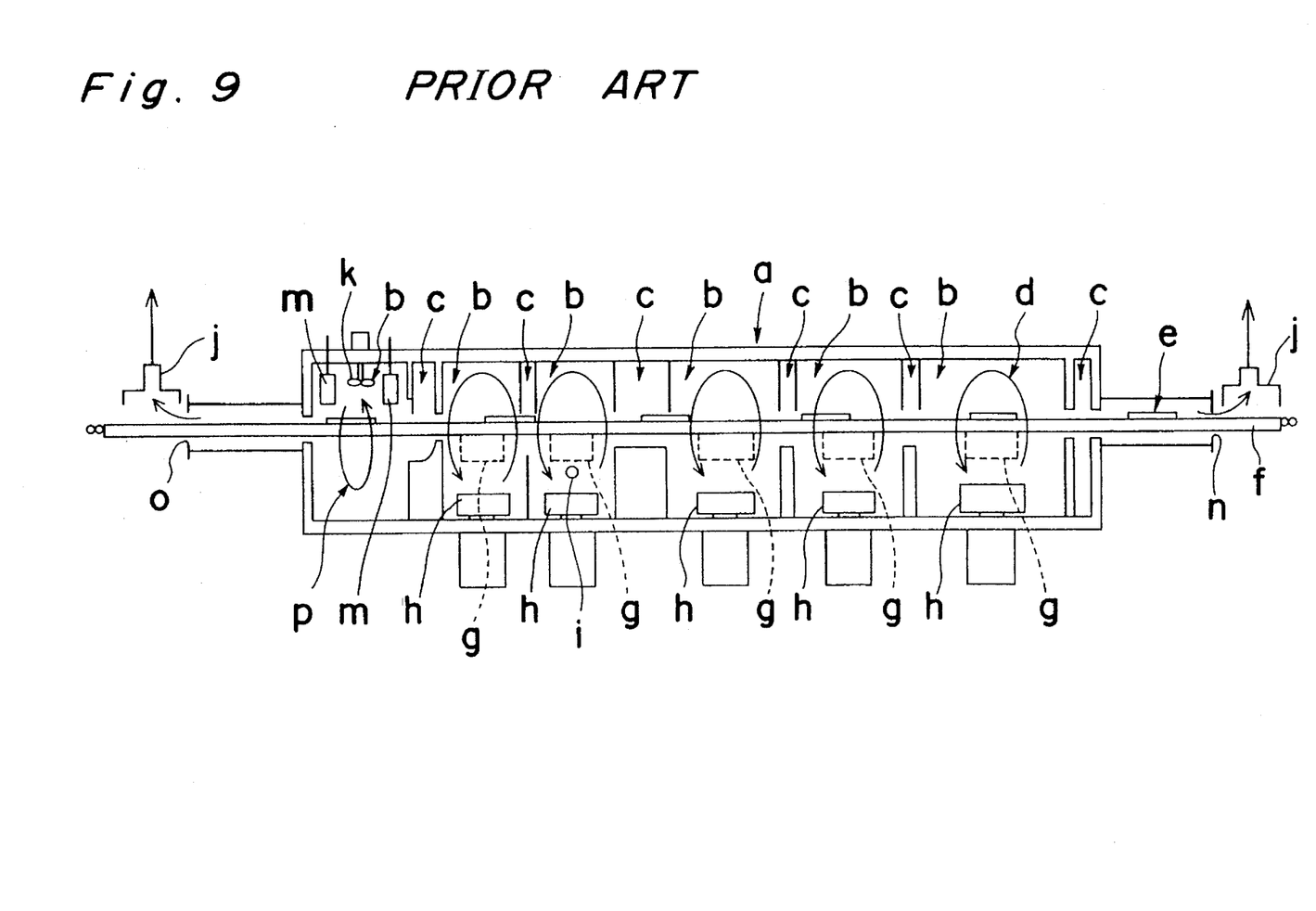
FIG. 9 is a sectional view showing the constitution of a conventional reflow apparatus.

A conventional example of the reflow apparatus will be depicted with reference to FIG. 9.

In FIG. 9, inside a reflow furnace (a), an ambient gas for heating or cooling each printed circuit board is separated for every predetermined temperature and circulated while being heated or cooled in a plurality of adjusting/circulating sections (b). Consequently, the printed circuit board is heated and the solder is melted to solder the electronic components. A transfer means (f) holding the printed circuit boards with the electronic components thereon runs through the adjusting/circulating sections (b). The ambient gas is circulated by a sirocco fan (h) and heated by a heater (g) in the heating-type adjusting/circulating sections (b). The heated ambient gas is circulated as shown by an arrow (d). In the cooling-type adjusting/circulation section (b), meanwhile, the ambience gas is circulated by a fan (k) and cooled by heat exchangers (m). The cooled ambient gas is circulated as shown by an arrow (p). A feed port (i) is formed in the heating adjusting/circulating section (b) so as to send the pressured ambient gas into the furnace (a). The amount of the pressured ambient gas, when sequentially moved and circulated and finally flowed outside through an inlet (n) or an outlet (o) is regulated at residence sections (c).

In the above-described constitution of the conventional reflow apparatus, the ambient gas pressured to not lower than the atmospheric pressure, is supplied from the feed port (i). The amount of the ambient gas that is moved is regulated by the action of the residence sections (c). The ambient gas is sequentially moved to the adjusting/circulating section (b) at the side of the inlet (n) or outlet (o) and finally sent out to the air through the inlet (n) or outlet (o). During this time, the moving ambient gas is circulated by the sirocco fans (h) in the heating adjusting/circulating sections (b) as shown by the arrow (d) and heated by the heaters (g). On the other hand, the moving ambient gas is cooled by the heat exchangers (m) in the cooling adjusting/circulating section (b) and circulated by the fan (k) as is indicated by the arrow (p). The ambient gas eventually flows out into the atmosphere through the inlet (n) or outlet (o) because of the originally-added pressure. The ambient gas is collected by compulsory ducts (j).

According to the conventional apparatus, components of a flux vaporized in the furnace as the solder is heated are circulated along with the ambient gas. Therefore, the amount of the flux components in the ambient gas is gradually increased. When the flux components adhere to parts of the furnace, particularly where the temperature is low, the reflow apparatus operates poorly. Moreover, the flux components may adhere to the printed circuit boards, which deteriorates the quality of the produced circuit boards.

In setting the temperature of each adjusting/circulating section, if the temperature difference is large, the ambient gas in the adjusting/circulating section of a higher temperature inevitably flows and leaks to the adjusting/circulating section of a lower temperature, whereby the temperature at the lower side cannot be controlled and is raised excessively. This results in defective circuit boards. Although a fresh ambient gas of a low temperature, nitrogen gas in most cases, is arranged to be supplied to the adjusting/circulating section of the lower temperature in order to solve the problem of the above excessive rise of the temperature in a recently-employed arrangement, this requires a larger amount of the ambient gas and disadvantageously increases the running costs of the apparatus.

SUMMARY OF THE INVENTION

The object of the present invention is therefore to provide a reflow apparatus which is adapted to automatically remove vaporized components of a flux sequentially from an ambient gas.

In accomplishing these and other objects, according to a first aspect of the present invention, there is provided a reflow apparatus comprising a reflow furnace, a transfer means for holding and transferring printed circuit boards with to-be-reflowed electronic components thereon from an inlet to an outlet of the furnace within the furnace, a plurality of adjusting/circulating sections wherein an ambient gas for heating the printed circuit boards is separated for every predetermined temperature in the furnace and circulated in a heater state; a feed port formed in the furnace to feed the ambient gas into the furnace under pressure, residence parts each provided between adjacent adjusting/circulating sections for regulating the amount of the ambient gas, when the ambient gas after being sent to and heated in the adjusting/circulating section adjacent to the feed port, is circulated and sequentially moved to the adjusting/circulating section at a side of the inlet or the outlet and finally flowed out through the inlet or outlet into atmosphere, suction ports opened in the furnace to such the ambient gas from the inside of the furnace, and a flux removing unit, separated from the furnace, for removing components of flux from the ambient gas sucked through the suck-out ports from the inside of the furnace.

BRIEF DESCRIPTION OF THE DRAWINGS

These and other objects and features of the present invention will become clear from the following description, taken in conjunction with the preferred embodiments thereof, and with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

A reflow apparatus according to a first embodiment of the present invention will be discussed hereinbelow with reference to FIG. 1.

Figure 1:
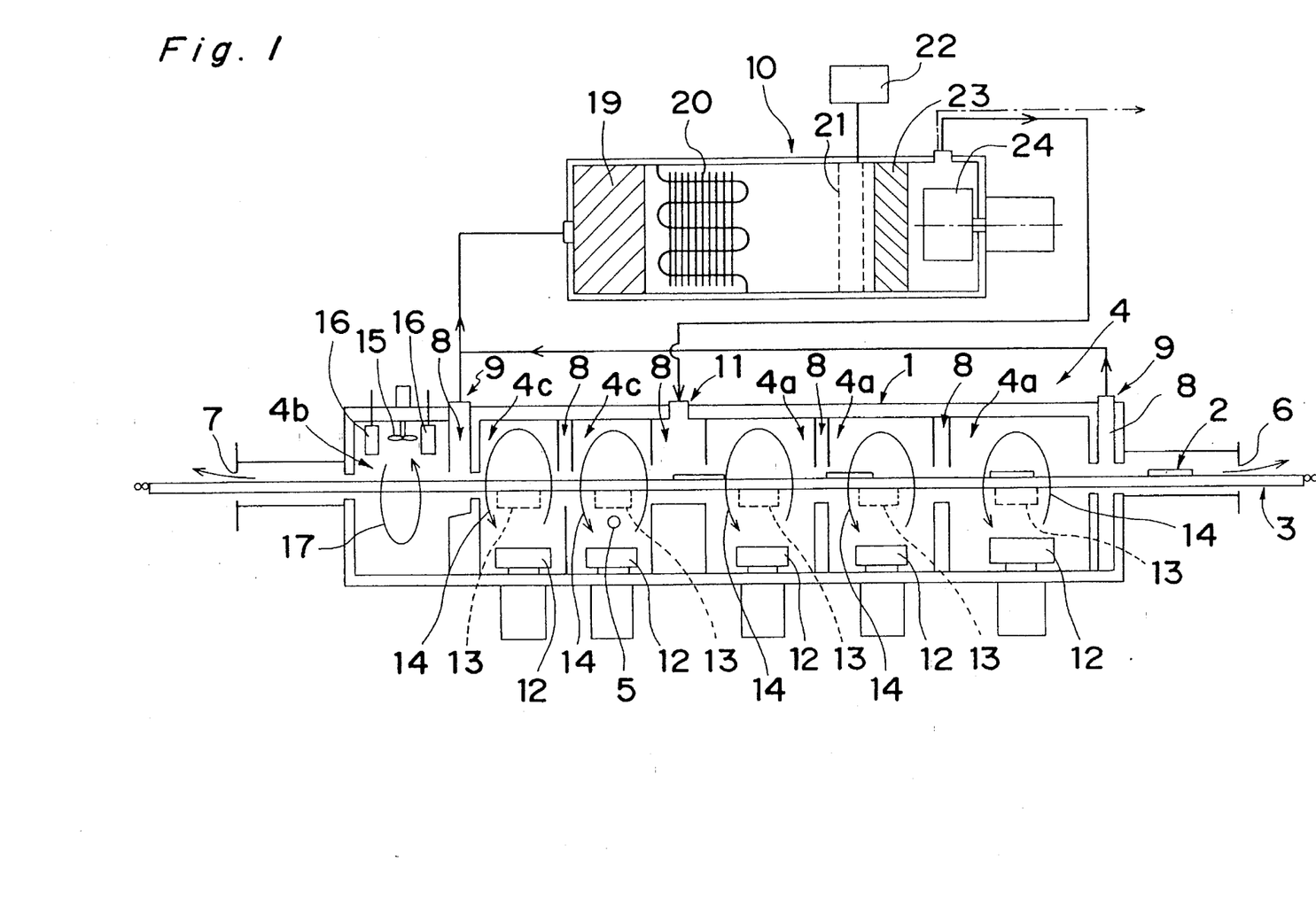
FIG. 1 is a sectional view showing the constitution of a reflow apparatus in accordance with a first embodiment of the present invention.

A reflow apparatus in FIG. 1 includes a rectangular parallelepiped reflow furnace 1, a transfer means 3, such as a belt conveyer, for carrying and transferring printed circuit boards 2 loading to-be-reflowed electronic components 2a within the reflow furnace 1 to carry in the circuit boards 2 from an inlet 6 of the furnace 1 and carry them out through an outlet 7 thereof, a plurality of ambient temperature adjusting/circulating sections 4, a feed port 5 provided in the furnace 1 so as to feed into the furnace 1 a pressured ambient gas for heating or cooling the printed circuit boards 2, and residence parts 8 between the adjacent adjusting/circulating sections 4. The ambient gas is separated for every predetermined temperature inside the furnace 1 and circulated in heated or cooled states in the adjusting/circulating sections 4. After the pressured ambient gas is moved to the adjusting/circulating section 4 adjacent to the feed port 5 and sequentially sent to the adjusting/circulating section 4 at the side of the inlet 6 or the outlet 7 of the furnace 1 while being heated and circulated within the sections 4, the ambient gas finally flows out into the atmosphere through the inlet 6 or outlet 7. During this time, the amount of the ambient gas is regulated at the residence parts 8. The residence parts 8 are constructed with two upper walls projected downwardly from the upper cell of the furnace 1 and one lower wall projected upwardly from the bottom of the furnace 1 with a heat insulator. The reflow apparatus is further provided with suction ports 9 formed in the reflow furnace 1 through which the ambient gas is sucked from the inside of the furnace 1, a rectangular parallelepiped flux removing unit 10 for removing flux components from the sucked ambient gas and, a return port 11 open to the furnace 1 to return the ambient gas into the furnace 1 after the flux components are removed from the ambient gas.

The adjusting/circulating sections 4 have three adjusting/circulating sections 4a for heating the ambient gas therein constituting a pre-heating zone, two adjusting/circulating sections 4c for reflow constituting a reflow zone, and one adjusting/circulating section 4b for cooling constituting a cooling zone. A sirocco fan (circulating means) 12 circulates the ambient gas in each heating adjusting/circulating section 4. At the same time, a heater 13 in each heating adjusting/circulating section 4a heats the ambient gas. The heated ambient gas is circulated as shown by an arrow 14. A fan 15 in the cooling adjusting/circulating section 4b circulates the ambient gas in the section 4b, which is cooled by heat exchangers 16. The cooled ambient gas is circulated in a direction as shown by an arrow 17. In order to supply the pressured ambient gas into the furnace 1, the feed port 5 is formed in one heating adjusting/circulating section 4a. The amount of the pressured ambient gas sequentially passing through the adjusting/circulating sections 4 to the outside from the inlet 6 or outlet 7 while being heated and circulated in the furnace 1 is regulated at the residence parts 8.

In the above-described constitution, the ambient gas, with pressure increased to not lower than the atmospheric pressure, is fed through the feed port 5 in the furnace 1 and sequentially moved to the adjusting/circulating sections 4, and finally sent out into 10 the atmosphere through the inlet 6 or outlet 7. At this time, the amount of the ambient gas that is moved is regulated by the action of the residence parts 8. The moving ambient gas is circulated by the sirocco fan 12 and heated by the heater 13 in each heating adjusting/circulating section 4a, as indicated by the arrow 14. Moreover, in the cooling adjusting/circulating section 4b, the ambient gas is circulated by the fan 15 and cooled by the heat exchangers 16 as shown by the arrow 17. The ambient gas is sent outside the apparatus from the inlet 6 or outlet 7 by the originally added pressure, whereby the amount of oxygen in the furnace 1 is maintained at a level that is at or lower than a predetermined value.

The flux removing unit 10 includes a filter 19, made for example of fine screen, a cooling fin 20 located on the downstream side of the filter 19, a heater 21 located on the downstream side of the fin 20, a controlling means 22 for controlling the temperature of the heater 21, a catalytic reaction part 23 located on the downstream side of the heater 21 for decomposing a flux, and circulating means (fan) 24 located on the downstream side of the catalytic reaction part 23 for sucking the ambient gas from the furnace 1 and returning it into the furnace 1. The circulating means may be a sirocco fan. The heater 21 heats the ambient gas sucked through the suck-out ports 9 and passing through the filter 19 and the cooling fin 20 so that it is easy to decompose flux in the gas with the catalytic reaction part 23.

The reflow apparatus operates in a manner as will be described below.

The ambient gas, for example nitrogen gas, which is pressured to not lower than the atmospheric pressure and supplied through the feed port 5, flows out through the inlet 6 or outlet 7 of the furnace 1, thereby maintaining a low concentration of oxygen in the furnace 1. The printed circuit boards 2 having to-be-mounted electronic components loaded thereon in a previous step are carried in and passed through the furnace by the transfer means 3. In this case, the three adjusting/circulating sections 4a at the inlet 6 are used as the preheating zone, the two sections 4c are used as the reflow zone, and one last section 4c at the side of the outlet 7 works as the cooling zone. The printed circuit boards 2 carried and transferred in the furnace 1 by the transfer means 3 are preliminarily heated at the preheating zone. The solder is melted at the reflow zone and the melted solder is solidified at the cooling zone. As a result, the loaded electronic components are soldered to the printed circuit boards 2.

The flux is partially vaporized during heating and becomes mixed with the ambient gas. Since the ambient gas is repeatedly circulated, the amount of flux components in the ambient gas is increased in accordance with the circulation of the ambience gas. If the ambience gas is left as it is, the flux components mixed in the ambient gas adhere to the interior of the furnace 1, causing an erroneous operation of the reflow apparatus, or the flux adhering to the inside of the furnace 1 contaminates the printed circuit boards 2 and thus produces defective circuit boards. The flux is easier to adhere to a part of the furnace 1 where the temperature is low, particularly in the vicinity of the inlet 6 and the outlet 7. As such, there are provided the suction ports 9 at the residence part 8 next to the inlet 6 and at the residence part 8 between the reflow zone and cooling zone. The ambient gas sucked through the suction ports 9 includes the vaporized flux components. The flux components are removed at the flux removing unit 10, and thereafter the ambient gas from which the flux components are removed is returned to the furnace 1 through the return port 11 between the reflow zone and pre-heating zone. Accordingly, an increase of the flux components in the ambient gas is avoided, thereby eliminating the above-noted conventional disadvantages due to the flux components being included in the ambient gas.

In the flux removing unit 10, flux components that are large particles are adapted to be removed by the filter 19, and the ambient gas is cooled by the cooling fin 20 to solidify and remove the flux therefrom. Thus, the ambient gas is heated again by the heater 21 controlled by the controlling means 22 to a predetermined temperature, so that the flux is decomposed to $CO_2$, $H_2O$, etc. due to the catalytic function of the catalytic reaction part 23. After the flux components are removed from the ambient gas, the ambient gas is returned into the furnace 1 by the circulating fan means 24 through the return port 11. In this case, since the amount of $H_2O$ is approximately equal to that in the atmosphere, the concentration in the furnace 1 is not influenced at all. Moreover, since $CO_2$ or $H_2O$ is a non-oxygen ambient component, $CO_2$ or $H_2O$ is mixed with the ambient gas as it is. The flux components adhering to the filter 19 and solidified by the cooling fin 20 should be cleaned regularly.

It is preferable that the suction ports 9 and return port 11 are formed at the residence parts 8. The reason is to secure the stable operation of the adjusting/circulating sections 4 because of the fact that the amount of the ambient gas circulated in the adjusting/circulating sections 4 is not directly influenced when the above suction and return ports 9, 11 are formed at the residence parts 8. On the contrary, if the suction or return ports 9, 11 are provided in the adjusting/circulating sections 4, the amount of the ambient gas circulated in the adjusting/circulating sections 4 is directly decreased or increased.

At the same time, the return port 11 is desirably provided at the residence part 8 between the reflow zone and preheating zone, because the ambient gas returning to the furnace 1 is considerably cooled in the pipe, whereby the temperature of the ambient gas moving from the reflow zone to the preheating zone is lowered appropriately. When the difference of the set temperatures between the reflow zone and the preheating zone is large, the ambient gas from the fellow zone raises the temperature of the preheating zone to one higher than the set temperature. That is, an excessive temperature rise is brought about in the pre-heating zone, resulting in the generation of defective products.

The reflow apparatus of the first embodiment of the present invention is provided with the suction ports formed in the furnace through which the ambient gas is sucked from the inside the furnace, the flux removing unit for removing flux components from the sucked ambient gas and the return port formed in the furnace for returning the ambient gas into the furnace after the flux components are removed. Owing to the constitution as above, even if the flux is vaporized in the furnace and included in the ambient gas, the flux included in the ambient gas is sequentially removed by the removing unit. Since the amount of the flux in the ambient gas is kept at a small value, such troubles inherent in the conventional apparatus the apparatus is brought in to trouble by the flux adhering to each part of the furnace, or the quality of the printed circuit boards is deteriorated by the adhesion of the flux, are eliminated.

Since the suction ports are formed at the residence parts, the amount of the circulated ambient gas in every adjusting/circulating section is not directly influenced even when the ambient gas is sucked. Therefore, the temperature at the adjusting/circulating section is stably adjusted.

The flux removing unit comprises the filter, cooling fin, heater, controlling means for controlling the temperature of the heater, catalytic reaction part for decomposing the flux, and circulating fan means for sucking the ambient gas from the inside the furnace and returning it to the furnace. The solidified or liquified flux is removed by the filter, and the vaporized flux is, on the other hand, partly cooled by the cooling fin to be liquified and removed. Further, the remaining flux is heated by the heater the temperature of which is controlled by the controlling means and decomposed to $O_2$ or $H_2O$, etc. at the catalytic reaction part. Thereafter, the ambient gas without the flux is returned to the furnace by the circulating fan means. In this case, the amount of $H_2O$ does not matter, because it is approximately the same as that in the atmosphere. Since $CO_2$ or $H_2O$ is a non-oxygen ambient, $CO_2$ or $H_2O$ is mixed with the ambient gas as it is.

Moreover, since the return port is located at a position where the ambient gas with the flux removed therefrom is returned to an excessive high temperature zone in the furnace, the ambience gas can be considerably cooled before it reaches the return port. In other words, the excessive temperature zone is cooled by the cooled ambient gas. Therefore, it becomes unnecessary to cool the excessive temperature zone with fresh ambience gas as in the conventional example.

A reflow apparatus according to a second embodiment of the present invention will be described with reference to FIG. 2.

Figure 2:
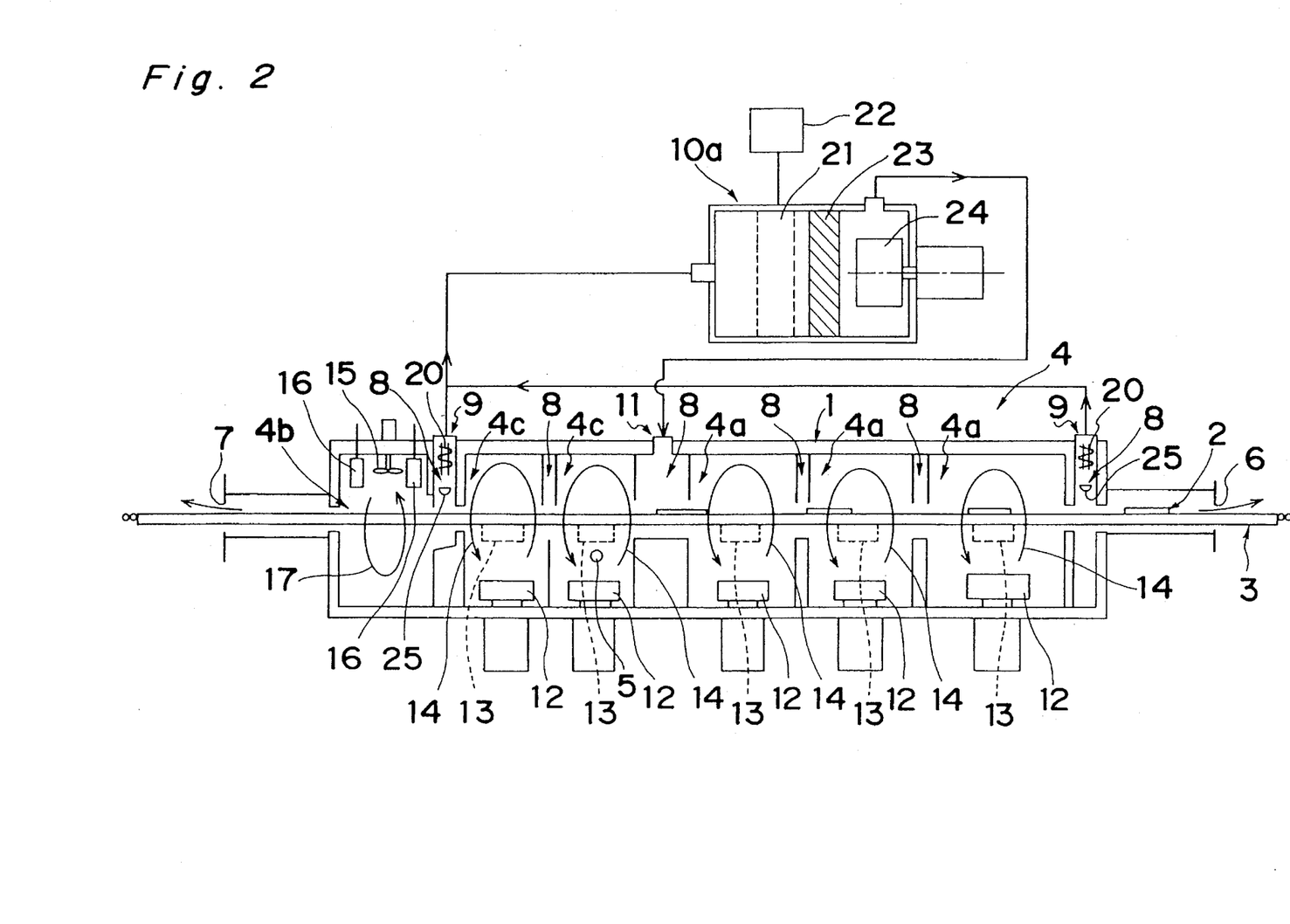
FIG. 2 is a sectional view showing the constitution of a reflow apparatus in accordance with a second embodiment of the present invention.

The second embodiment shown in FIG. 2 is different from the first embodiment in FIG. 1 in that the cooling fins 20 for removing the flux from the ambient gas are set inside the suction ports 9 of the reflow furnace 1, each having a flux receiver 25 therebelow to receive the cooled and liquified flux. Accordingly the flux removing unit 10a comprises the heater 21, controlling means 22, catalytic reaction part 23, and circulating fan means 24, but, without the filter 19 and cooling fin 20 of the first embodiment.

The constitution is otherwise the same as in the first embodiment of FIG. 1, and the same parts are designated by the same reference numerals, the description of which will be abbreviated here.

The second embodiment features the cooling fins 20 provided in the vicinity of the inlet 6 of the furnace 1 and the cooling adjusting/circulating section 4b. In this arrangement, the flux is prevented from adhering in the vicinity of the inlet 6 and in the vicinity of the cooling adjusting/ circulating section 4b, where the flux is apt to adhere. The contamination of the printed circuit boards 2 by the adhering flux is thus lessened.

Since the cooling fins 20 are installed at the side of the furnace 1, the filter 19 and the cooling fin 20 employed in the first embodiment of the flux removing unit 10 are omitted in the second embodiment.

The cooling fin 20 for removing the flux is provided at the inner side of the suction port 9 in the furnace and, at the same time, the cooling fin is equipped with the receiver 25 to receive the liquified flux therebelow. Therefore, the adhesion of the flux to the interior of the furnace in the vicinity of the cooling fin is decreased.

In addition, if the cooling fin is installed both in the vicinity of the inlet of the furnace and in the vicinity of the cooling adjusting/circulating section, the flux is prevented from adhering in the vicinity of the inlet and the cooling adjusting/circulating section, where the flux, is highly liable to adhere. The contamination of the printed circuit boards by the adhering flux, which is an annoying part of the conventional arrangement, is hence reduced.

In the case where the cooling fin is set at the side of the furnace, it is sufficient for the flux removing unit to be composed of the heater, controlling means for controlling the temperature of the heater, catalytic reaction part for decomposing the flux, and circulating fan means for sucking the ambient gas from inside the furnace and returning the gas to the furnace.

A reflow apparatus according to a third embodiment of the present invention will be described with reference to FIG. 3.

Figure 3:
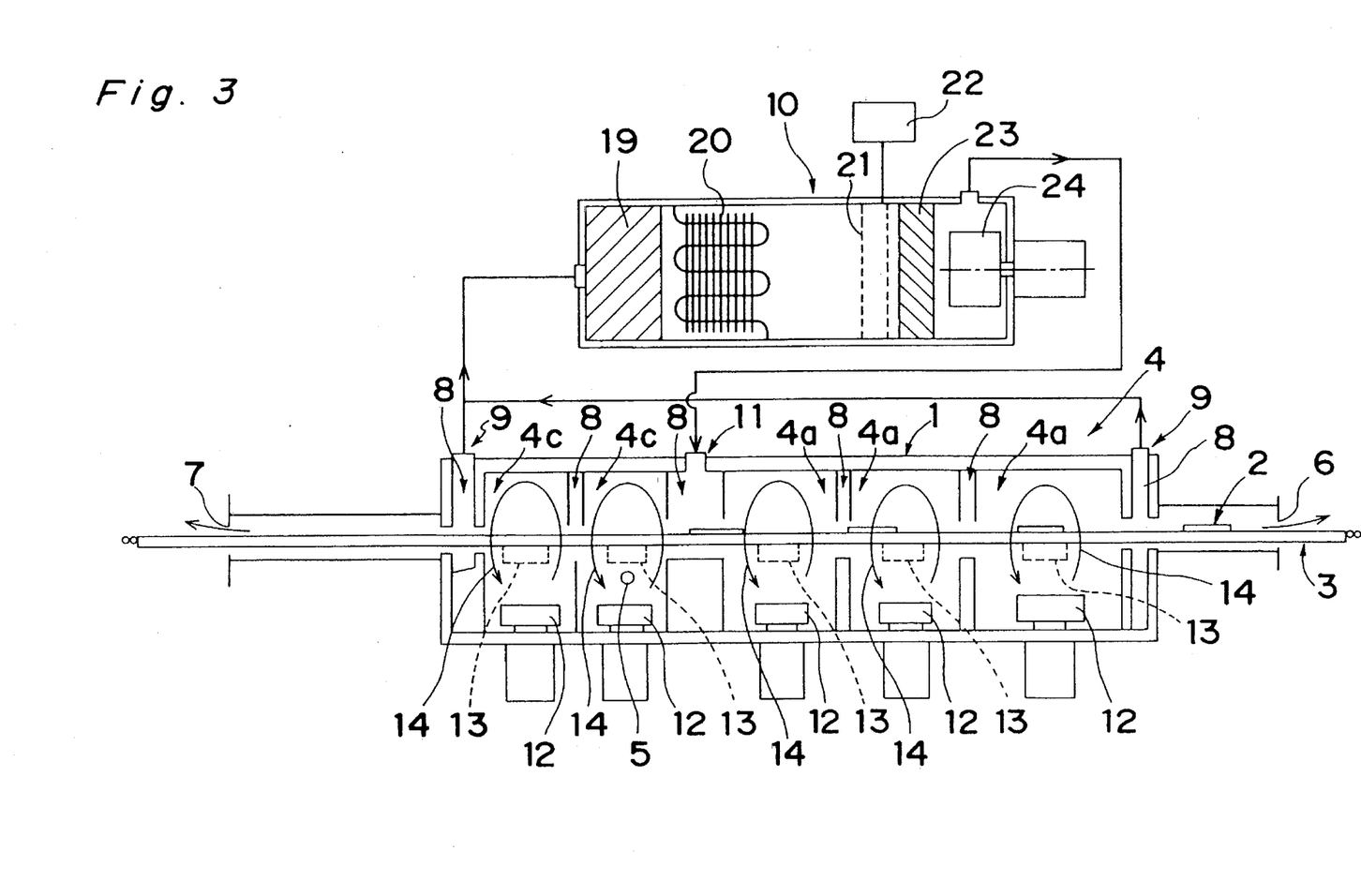
FIG. 3 is a sectional view showing the constitution of a reflow apparatus in accordance with a third embodiment of the present invention.

The third embodiment shown in FIG. 3 is different from the first embodiment in FIG. 1 in that the cooling adjusting/ circulating section 4b is omitted, and the suction port 9 is provided in the residence part 8 next to the outlet 7. The cooling adjusting/circulating section 4b may be provided at any portion in a sequential process. The reflow apparatus according to the third embodiment can obtain approximately the same operation and effects as the first embodiment.

In the embodiments, the suction port 9 may be provided at the residence part 8 between the adjusting/circulating sections 4a in the reflow zone, or the residence part 8 between the adjusting/circulating sections 4a and 4c between the reflow zone and pre-heating zone.

In the embodiments, the return port 11 may not be provided, and the ambient gas from which the flux is removed by the flux removing unit 10 may be discharged into the atmosphere as shown by a dashed line in FIG. 1 so as not to return to the reflow furnace 1. Instead, the ambient gas from which the flux is removed by the flux removing unit 10 may be supplied to another apparatus, such as an ambient gas feeding apparatus for feeding the pressured ambient gas through the feed port 5 to then be returned to the reflow furnace 1 through the other apparatus.

According to the reflow apparatus of the present invention, since the flux components vaporized in the furnace are removed by the flux removing unit, the reflow apparatus is prevented from operating improperly due to the adhesion of vaporized flux components at low temperature parts in the furnace. The generation of inferior products due to the contamination of the printed circuit boards by the adhering flux components is also avoided.

The ambient gas, after the flux is removed therefrom, is utilized to cool the part of the furnace where the temperature is excessively raised. In comparison with the prior art, in which the furnace is cooled by using fresh ambient gas, the running cost is advantageously lowered.

In addition, the reduction in the amount of the flux components adhering to the furnace makes the maintenance of the reflow apparatus easy.

Since the suction ports and the return port are formed at the residence parts, it is possible to suck and return the ambient gas without directly influencing the amount of the ambient gas circulated in the adjusting/circulating sections.

Since the suction ports 9 are provided at the residence parts 8 next to the inlet 6 and the outlet 7, organic solvent, which is included in the gas in the reflow furnace 1, and might flow out through the inlet 6 and outlet 7, can be certainly sucked through the suction ports 9 to effectively prevent the organic solvent from be flown out through the inlet 6 and outlet 7.

The flux removing unit 10 is separated from the reflow furnace 1, and thus the size of the reflow furnace 1 can be reduced and made compact, and the unit 10 can be attached at to reflow furnaces already in place and that have no flux removing mechanism without replacing the entire reflow furnaces with new ones. Moreover, during maintenance, repair, or exchange operations of the flux removing unit 10, it is unnecessary to stop the operation of the reflow furnace 1, because the flux removing unit 10 is separate from the reflow furnace 1. Furthermore, the flux removing unit, 10 is constituted by one unit and thus it is easy to exchange the unit 10 for a new one.

Now, each suck-out port 9 will be discussed in detail.

Figure 4:
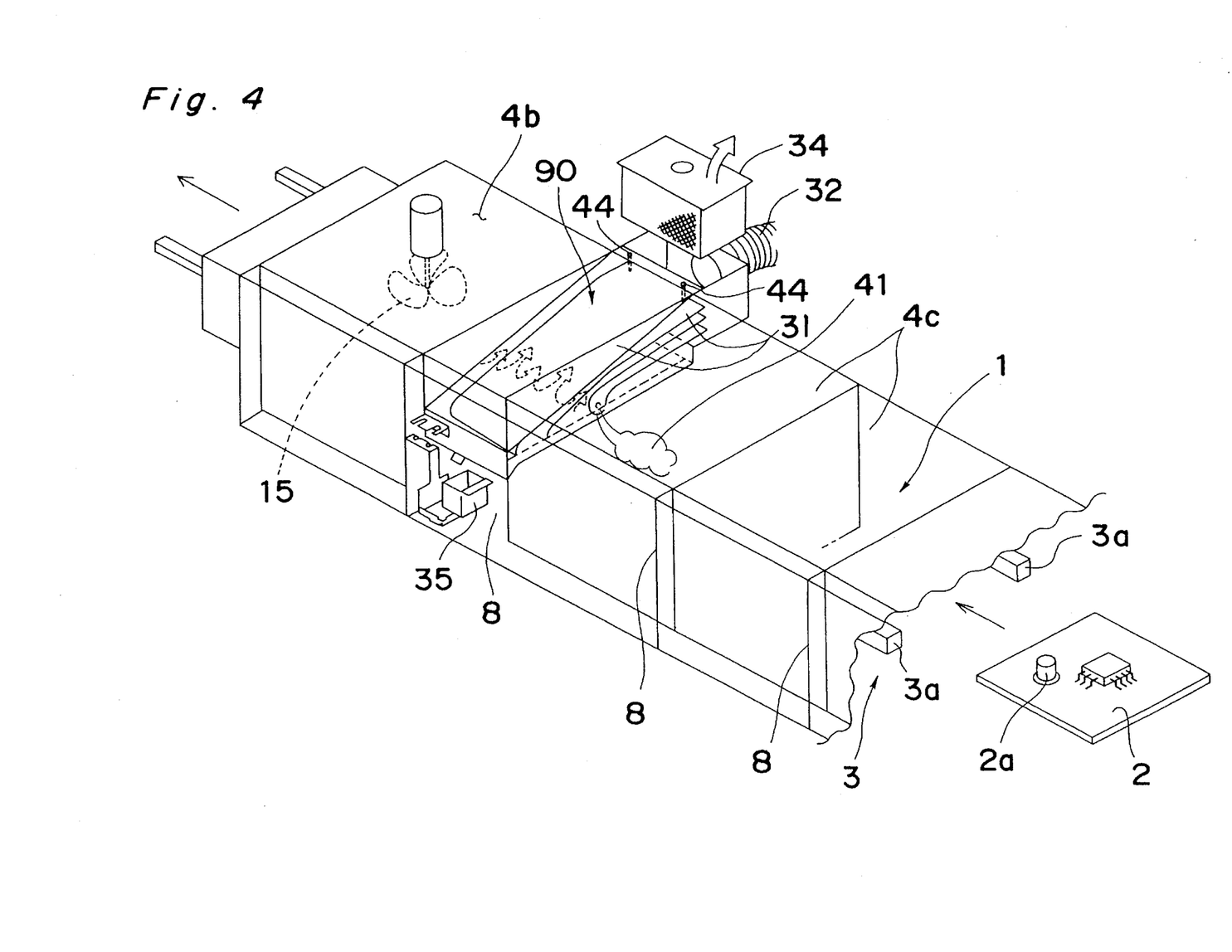
FIG. 4 is a perspective view of a part of a reflow apparatus with a suction hood according to one example of a suction port of the present invention.

The outer appearance of an upper suction hood 90, which serves as one example of the suction port 9, is indicated in FIG. 4. The hood 90 is set over the upper surface of the reflow furnace 1. A suction opening of the hood 90 is directed downward to face the transferring surface of the to-be-processed circuit board 2. A discharge hose 32 is connected to the rear part of the hood 90, through which ambient gas 41 in the reflow furnace 1 is sucked out. A duct filter 34 of metal mesh (screen) is disposed in front of the discharge hose 32 to remove fume or mist components of the ambient gas 41. In FIG. 4, reference numeral 3a denotes a transferring rail serving as one example of the transfer means 3.

Figure 5A:
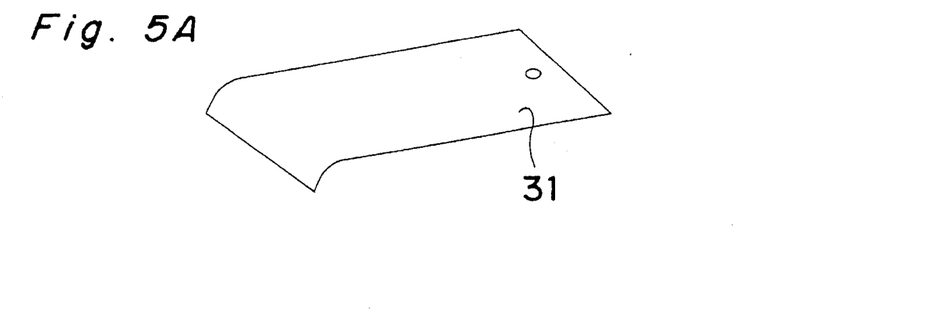
FIG. 5A is a perspective view of a straightening plate for uniform suction of the ambient gas.
Figure 5B:
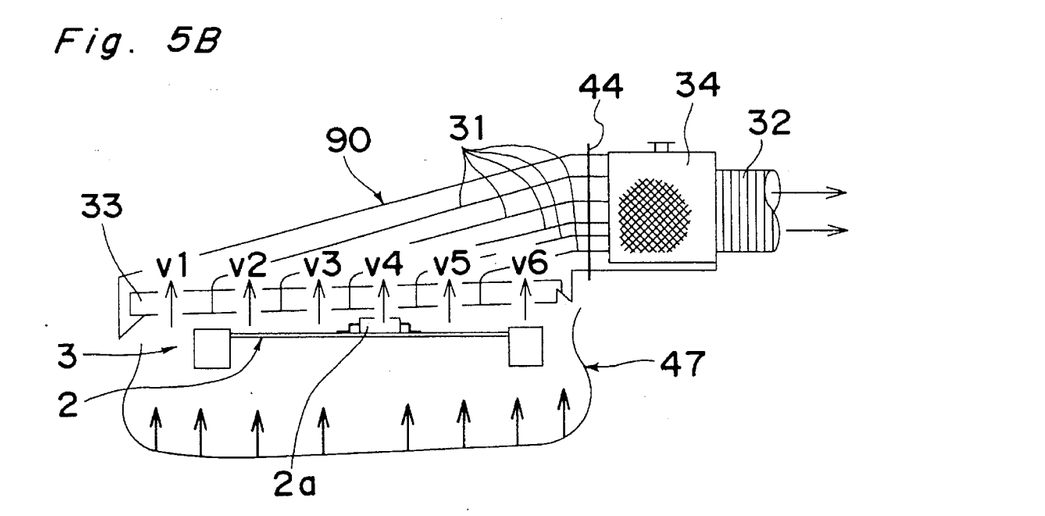
FIG. 5B is a vertical sectional view of a suction duct with the straightening plate in a direction traversing a to-be-processed circuit board to the transferring direction.
Figure 6A:
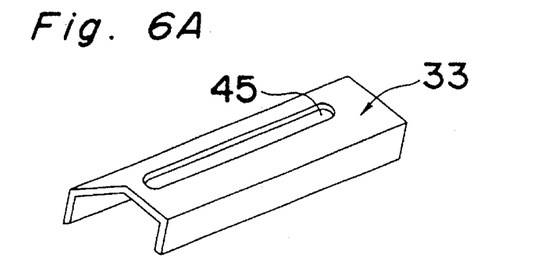
FIG. 6A is a perspective view of a suction velocity acceleration slit plate of the suction duct in FIG. 5B.
Figures 6B, 6D:
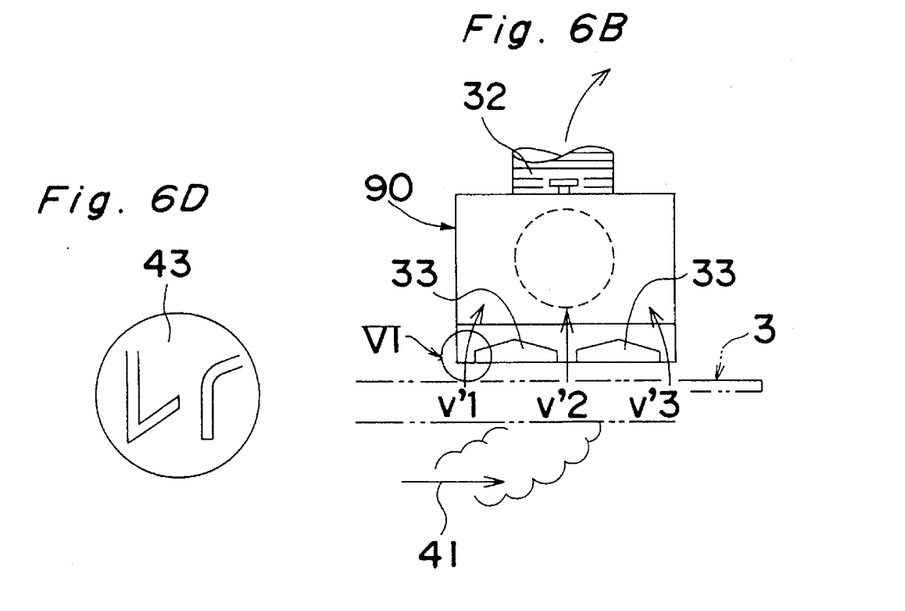
FIG. 6B is a vertical sectional view of the slit plate in the suction duct in parallel to the transferring direction of the circuit board.
FIG. 6D is an enlarged view of a portion shown by a circle VI in FIG. 6B.

The internal structure of the upper suction hood 90 will be described with reference to FIGS. 5A, 5B and 6A, 6B. FIG. 5A shows the configuration of a straightening plate 31 for uniformly sucking the ambient gas, and FIG. 5B is a vertical sectional view of an ambient gas suction duct in a direction traversing the reflow furnace 1. FIG. 6A is a diagram of an acceleration slit plate 33 for accelerating the wind velocity of the ambient gas when it is sucking time. FIG. 6B is a vertical sectional view of the ambient gas suction duct in a direction parallel to the transferring direction of the circuit board 2. Five straightening plates 31 uniformly separate the suction surface of the upper suction hood 90 at the entrance into six portions in a direction widthwise of the transferring direction.

Each interval between the straightening plates 31 is optionally adjustable by means of a fixing means 44 such as bolts with screws and nuts fitted in front of the duct filter 34 in the rear part of the hood 90.

As indicated in FIGS. 6A and 6B, there are two acceleration slit plates 33 disposed at the suction surface of the hood 90. Each slit plate 33 has a reversed-U shape cross section having a slit 45 at the central part thereof to suck the flux fume held at the central part.

Figure 7:
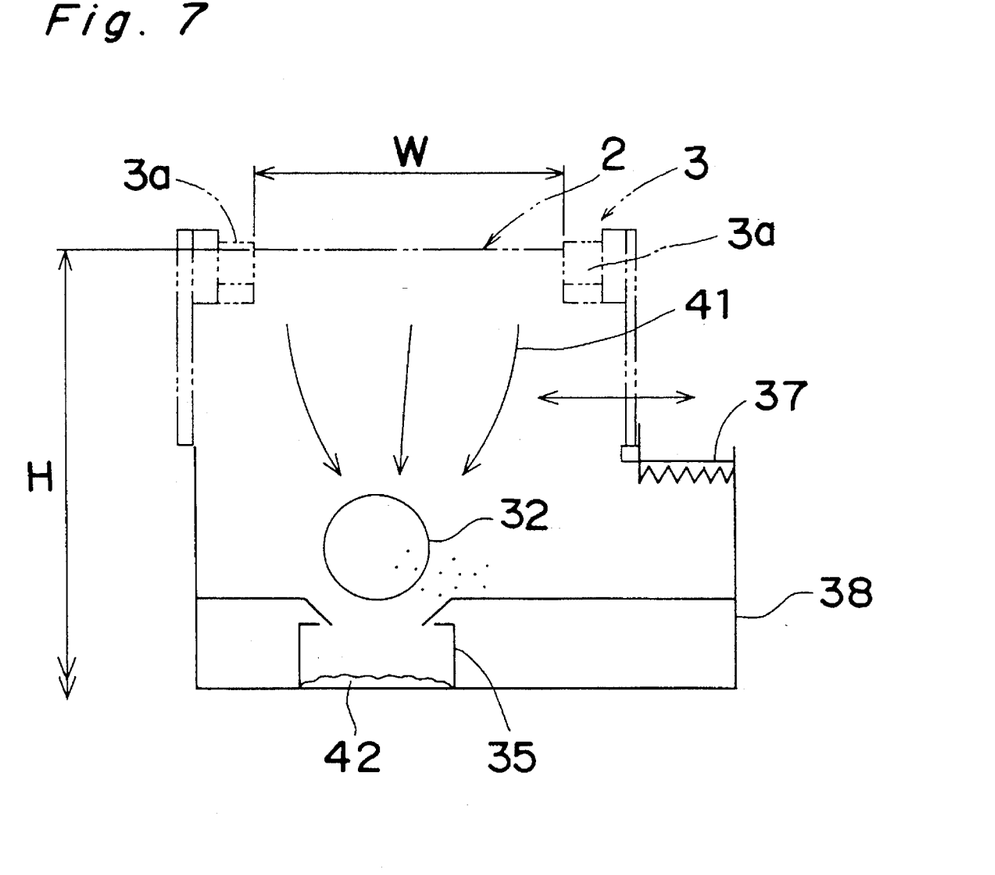
FIG. 7 is a diagram of a bellows-type variable shutter for adjusting the opening width of the suction duct at the inlet and outlet of the reflow furnace.

Referring to FIG. 7, a bellows-type variable shutter 37 is provided at an ambient gas suction duct 38 at the rear wall of one of transferring conveyer rails 3a, which adjusts the width of the opening part of the suction duct 38 in accordance with the width W of the circuit board 2 to the transferring direction. At the same time, a flux collecting box 35 is set down below the transferring surface of the circuit board 2. The discharge hose 32 is also connected in the rear part of the suction duct 38, through which the ambient gas 41 in the hood 90 is sucked out. The discharge hoses 32 connected to the hoods 90 and the suction ducts 38 are connected to the flux removing unit 10.

Figure 5C:
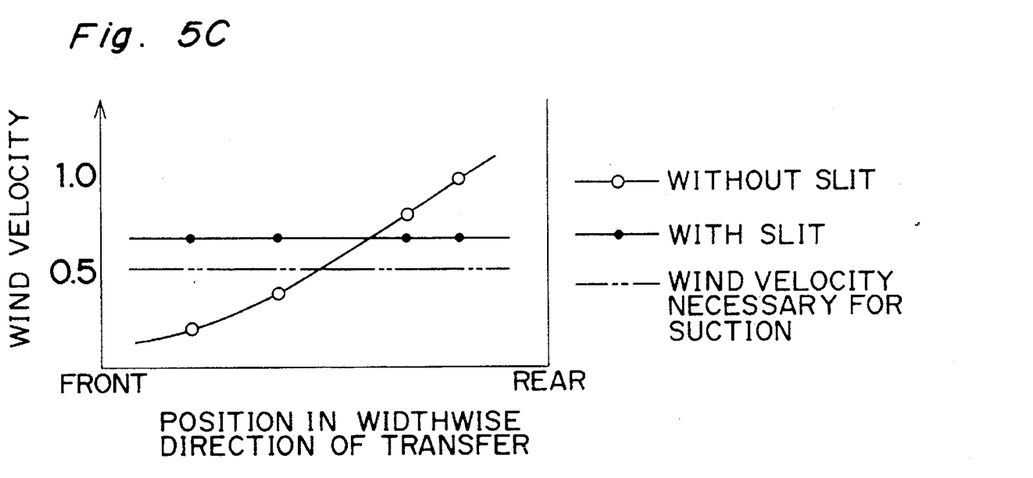
FIG. 5C is a characteristic diagram of suction velocity of the duct in FIG. 5B.
Figure 10:
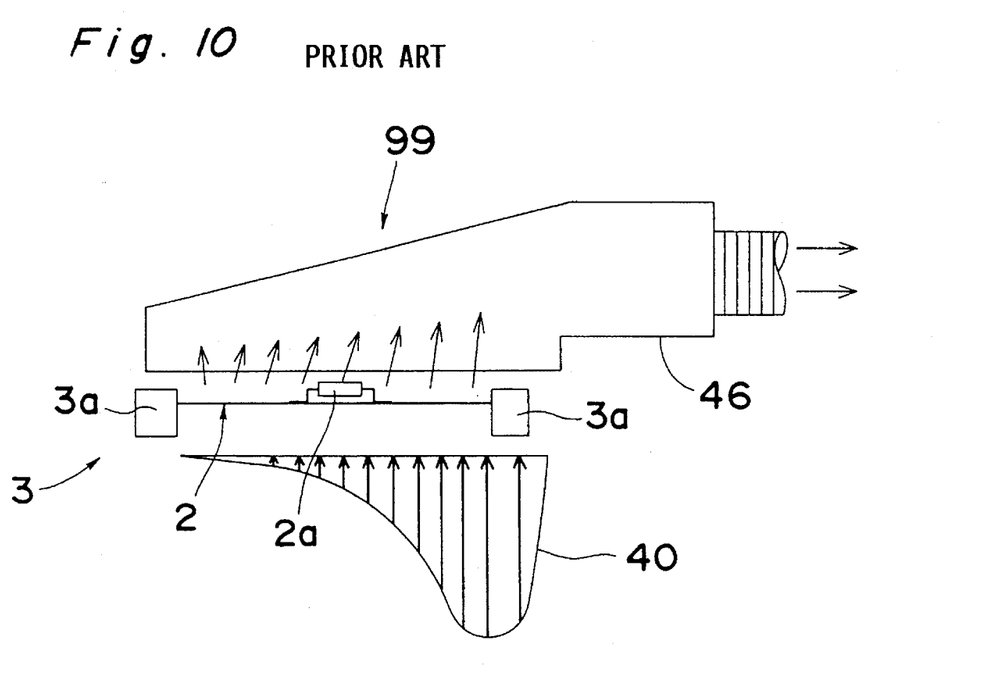
FIG. 10 is a view showing a hood used in a conventional reflow apparatus.

In the reflow furnace 1, the suction opening part of the hood 90 is divided by the suction straightening plates 31 into a plurality of sections parallel to the transferring direction of the circuit board 2, and moreover, the interval between the suction straightening plates 31 is adjusted at the rear part of the flow path in the hood 90 by the fixing means 44. In consequence, as is clearly shown in FIG. 5B, the velocity and the amount of the ambient gas when it is sucked is made uniform for every separated section of the suction opening part (v1, v2, v3, v4, v5, v6) as shown in FIG. 5C. The distribution of the suction velocity 47 corresponds to that of the velocity necessary to blow the ambient gas out of the suction opening part. Contrarily, since a hood 99 having a vacant space inside the suction surface without straightening plates is used in the conventional apparatus as shown in FIG. 10, the distances between points on the suction surface and the duct connecting portion 46 are different from each other, and thus the wind velocities during suction are not uniform. Reference numeral 40 denotes a distribution of the velocities. As described earlier, the interval of the suction straightening plates 31 is optionally adjusted by the fixing means 44 such as the bolts with screws and nuts in front of the mesh duct filter 34.

The ambient gas 41 from the reflow furnace 1 is uniformly sucked in the widthwise direction of the transferring direction of the circuit board 2 with the same set flow rate or optimum flow rate through each divided part, as shown in FIG. 5C.

Figure 6C:
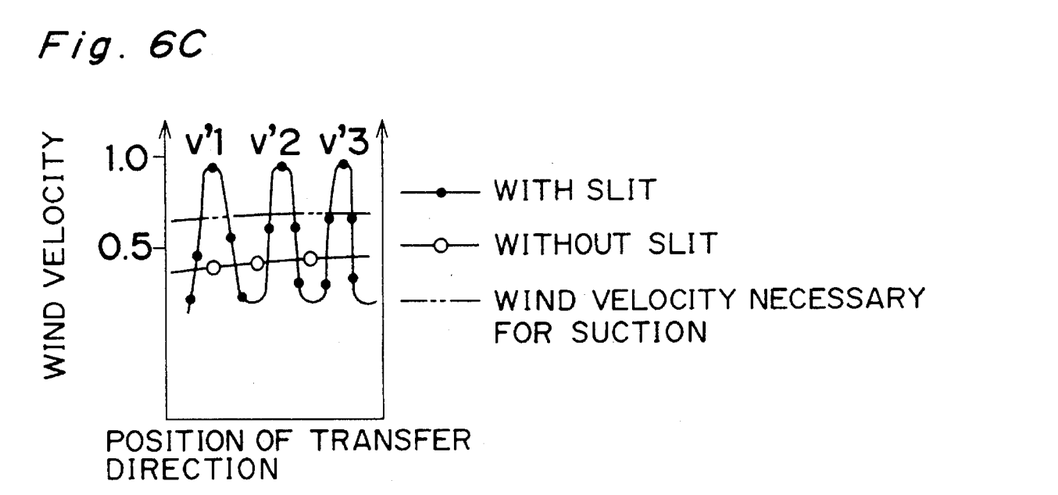
FIG. 6C is a characteristic diagram of the suction velocity of the duct in FIG. 6B.

As illustrated in FIGS. 6A and 6B, the velocity is increased more at the suction opening part of the hood 90 narrowed by the acceleration slit plates 33 than within the hood 90 even if the amount of suction is the same. More specifically, as is clear from FIG. 6C, the velocity at a portion between the slit plates 33 exceeds the velocity necessary for suction of the ambient gas (catching velocity of the ambient gas), and thus the ambient gas 41 in to the reflow furnace 1 is sucked in the hood 90. The ambient gas remaining without it firstly caught at the suction opening parts between the slit plates 33 and guided into the reversed-U shaped slit plates 33 and then sent out through the slits 45 at the top of the slit plates 33 into the hood 90. The hood 90 has the three narrowed suction opening parts and thus the ambient gas 41 is sucked in the hood 90.

In FIG. 7, showing the shutter mechanism at the lower suction duct 38 at the inlet 6 of the reflow furnace 1, the width of the opening part of the suction duct 38 is adjusted by the bellows-type variable shutter 37 in accordance with the width of the circuit board 2, and thus the suction amount of the ambient gas can be reduced by eliminating an unnecessary space. Accordingly, the sucking of the ambient gas is optimized with the required velocity.

Moreover, the constitution of the hood 90 can be applied to a hood serving as the return port 11 so that the return flow of the ambient gas, opposite to the suction flow of the ambient gas, can be produced when the flux components are removed from the ambient gas and then the gas is returned in the reflow furnace 1.

Figure 8A:
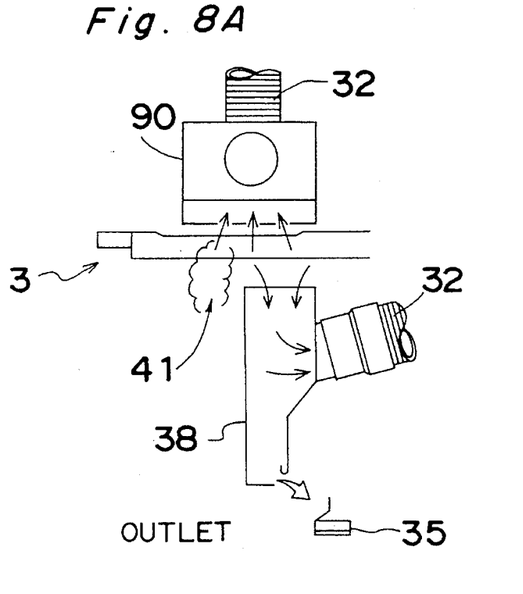
FIGS. 8A and 8B are views of the suction ducts and hoods at the inlet and outlet in the reflow furnace.
Figure 8B:
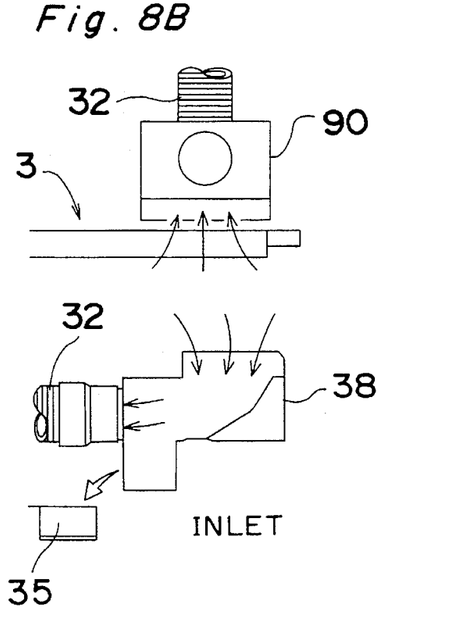

Although the foregoing description is directed to an arrangement sucking the flux fume flowing along the upper surface of the printed circuit board 2, the reflow apparatus of the present invention can be further provided with suction ducts 38 at the inlet 6 and the outlet 7 of the reflow furnace 1 above and below the circuit board 2 as shown in FIGS. 8A and 8B. Therefore, the ambient gas 41 in the reflow furnace 1 flowing along the upper surface of the circuit board 2 is caught and sucked by the upper duct, that is, the hood 90, while the ambient gas 41 flowing along the lower surface of the circuit board 2 is caught and sucked by the lower suction duct 38.

The flux is collected in a manner as will be described hereinbelow.

Oil mist components such as the flux fume or the like included in the ambient gas are cooled and condensed when in touch with the outer frame of the hood 90, suction straightening plates 31, acceleration slit plates 33, and then mesh duct filter 34 at the suction port 9. The resulting liquid drops of the flux gather, running along the inclined lower end face of the hood 90, in a pipe groove 43 formed at the lower end of the outer frame of the hood 90 as shown by a circle VI in FIG. 6D. Owing to the inclined lower end face of the opening part of the hood 90, the liquid drops 42 trace the pipe groove 43 to be collected in the collecting box 35.

According to the advantage of the present invention as depicted hereinabove, components of the ambient gas condensed to liquid drops are collected by the detachable container, i.e. flux collecting box 35, with an upper face opened, so that the flux fume, etc. included in the ambient gas is properly disposed of.

At the hood 90 at the suction port 9 of the reflow apparatus, straightening plates 31 for uniforming the suction velocity and slit plates 33 for securing the necessary velocity collect the solid and liquid components in the ambient gas without leaking the ambient gas with the minimum capacity of the suction. The suction hood 90 hence realizes an ambient gas sucking device which is convenient to maintain.

Moreover, the device produces a stable air flow at the inlet and the outlet of a nitrogen reflow furnace or reflow furnaces with other kinds of ambient gases, not disturbing the temperature and components of the ambient gas in the furnace.

At the suction port or return port in the reflow apparatus of the embodiment of the present invention, since the straightening plates separate the suction opening part and the interior of the hood into a plurality of sections in parallel to the transferring direction of the to-be-processed circuit board, the gas in the reflow furnace, i.e., flux fume, is uniformly sucked with an optimum flow rate through each divided suction part in the widthwise direction of the to-be-processed circuit board.

Moreover, because of the presence of the adjusting slit plates to narrow the suction surface at the opening part, a small amount of suction is utilized to greatest effect, whereby the velocity when the flux fume is sucked is remarkably increased.

Further, the increased length of the hood in the flowing direction of the ambient gas perfectly prevents the leak of the flux fume.

The variable bellows-type shutter adjusts the width of the suction or return opening part of the suction or return duct in accordance with the width of the to-be-processed circuit board in the transferring direction. Therefore, the size of the suction or return opening part can be changed corresponding to the opening width of the reflow furnace, eliminating unnecessary space for sucking or returning.

Since the suction ducts are provided at the inlet and outlet in the furnace above and below the to-be-processed circuit board, the gas in the reflow furnace along the upper surface of the to-be-processed circuit board is caught and sucked by the upper duct, and also the ambient gas along the lower surface of the to-be-processed circuit board is caught and sucked by the lower duct.

Owing to the above-described advantageous constitution of the embodiment, the flux fume in the reflow furnace can be sucked positively without fail.

The oil mist components included in the sucked gas are cooled and condensed when coming in touch with the outer frame of the hood. The condensed liquid drops following the inclined lower end face of the suction hood are collected at one point along the pipe groove.

At the return port in the reflow apparatus of the embodiment, since the straightening plates separate the return opening part and the interior of the hood into a plurality of sections parallel to the transferring direction of the to-be-processed circuit board, the gas is uniformly returned to the furnace with an optimum flow rate through each divided return part.

Moreover, because of the presence of the adjusting slit plates to narrow the return surface at the opening part, a small amount of wind from the hood is most effectively utilized, whereby the velocity of the gas when returned is remarkably increased.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A reflow apparatus comprising:
   a reflow furnace having an inlet and an outlet;
   a transfer means for holding and transferring printed circuit boards with to-be-reflowed electronic components thereon within said reflow furnace from said inlet to said outlet of said reflow furnace;
   a plurality of adjusting/circulating sections in said reflow furnace separating said reflow furnace into predetermined temperature regions in which an ambient gas used for heating the printed circuit boards is to be circulated in a heated state;
   a feed port at one of said adjusting/circulating sections in said reflow furnace for feeding the ambient gas under pressure into the furnace;
   residence parts provided between adjacent ones of said adjusting/circulating sections for regulating the amount of the ambient gas that moves from the one of said adjusting/circulating sections having said feed port thereat sequentially to others of said adjusting/circulating sections and to said inlet or said outlet and to the atmosphere;
   suction ports in said reflow furnace for sucking the ambient gas from said reflow furnace; and
   a flux removing unit separate from said reflow furnace for removing components of a flux from the ambient gas that is sucked out of said reflow furnace through said suction ports.

2. The reflow apparatus of claim 1, and further comprising a return port in said reflow furnace, to which the ambient gas from said flux removing unit, having flux components thereof removed, is returned to return the ambient gas to said reflow furnace.

3. The reflow apparatus of claim 1, wherein said predetermined temperature regions comprise a preheating zone comprising at least one of said adjusting/circulating sections and a reflow zone also comprising at least one of said adjusting/circulating sections, and said return port is located at one of said residence parts between said at least one of said adjusting/circulating sections of said preheating zone and said at least one of said adjusting/circulating sections of said reflow zone.

4. The reflow apparatus of claim 1, wherein said predetermined temperature regions comprise a preheating zone comprising at least one of said adjusting/circulating sections and a reflow zone also comprising at least one of said adjusting/circulating sections, said return port is located at one of said residence parts between said at least one of said adjusting/circulating sections of said preheating zone and said at least one of said adjusting/circulating sections of said reflow zone, and said suction ports are located at said residence parts between said inlet and said at least one of said adjusting/circulating sections of said preheating zone and between said outlet and said at least one of said adjusting/circulating sections of said reflow zone.

5. The reflow apparatus of claim 1, wherein:
   said predetermined temperature regions comprise a preheating zone comprising at least one of said adjusting/circulating sections, a reflow zone also comprising at least one of said adjusting/circulating sections and a cooling zone also comprising at least one of said adjusting/circulating sections; and
   said suction ports are located at said residence parts between said inlet and said at least one of said adjusting/circulating sections of said preheating zone and between said at least one of said adjusting/circulating sections of said reflow zone and said at least one of said adjusting/circulating sections of said cooling zone.

6. The reflow apparatus of claim 2, wherein:
   said predetermined temperature regions comprise a preheating zone comprising at least one of said adjusting/circulating sections, a reflow zone also comprising at least one of said adjusting/circulating sections and a cooling zone also comprising at least one of said adjusting/circulating sections;
   said suction ports are located at said residence parts between said inlet and said at least one of said adjusting/circulating sections of said preheating zone and between said at least one of said adjusting/circulating sections of said reflow zone and said at least one of said adjusting/circulating sections of said cooling zone; and
   said return port is located at said residence part between said at least one of said adjusting/circulating sections of said preheating zone and said at least one of said adjusting/circulating sections of said reflow zone.

7. The reflow apparatus of claim 1, wherein said suction ports are located at said residence parts.

8. The reflow apparatus of claim 1, wherein said flux removing unit comprises a cooling fin, a heater, a controlling means for controlling the temperature of said heater, a catalytic reaction part for decomposing flux and a circulating fan for sucking the ambient gas from said reflow furnace.

9. The reflow apparatus of claim 2, wherein said flux removing unit comprises a cooling fin, a heater, a controlling means for controlling the temperature of said heater, a catalytic reaction part for decomposing flux and a circulating fan for sucking the ambient gas from said reflow furnace.

10. The reflow apparatus of claim 6, wherein said flux removing unit comprises a cooling fin, a heater, a controlling means for controlling the temperature of said heater, a catalytic reaction part for decomposing flux and a circulating fan for sucking the ambient gas from said reflow furnace.

11. The reflow apparatus of claim 1, wherein at least one of said suction ports comprises a cooling fin for removing flux from the ambient gas, said cooling fin being located at said at least one of said suction ports inside said reflow furnace, and a flux receiver for receiving cooled and liquefied flux located below said cooling fin in said reflow furnace.

12. The reflow apparatus of claim 6, wherein at least one of said suction ports comprises a cooling fin for removing flux from the ambient gas, said cooling fin being located at said at least one of said suction ports inside said reflow furnace, and a flux receiver for receiving cooled and liquefied flux located below said cooling fin in said reflow furnace.

13. The reflow apparatus of claim 1, wherein:

said flux removing unit comprises a heater, a controlling means for controlling the temperature of said heater, a catalytic reaction part for decomposing flux and a circulating fan for sucking the ambient gas from said reflow furnace; and at least one of said suction ports comprises a cooling fin for removing flux from the ambient gas, said cooling fin being located at said at least one of said suction ports inside said reflow furnace, and a flux receiver for receiving cooled and liquefied flux located below said cooling fin in said reflow furnace.

14. The reflow apparatus of claim 1, wherein at least one of said suction ports comprises a hood having a suction opening and an interior space accommodating a plurality of straightening plates and forming a flow path for the ambient gas in said hood such that said suction opening of said hood is divided into a plurality of sections that extend parallel to a transfer direction of said transfer means for guiding sucked ambient gas into said hood, said straightening plates having adjustable intervals such that the velocity and amount of the ambient gas is freely adjustable when the ambient gas is sucked through said at least one of said suction ports.

15. The reflow apparatus of claim 14, wherein said hood further comprises a plurality of slit plates located at said suction opening of said hood reducing the size of said suction opening, each of said slit plates having a space for accumulating the ambient gas and a slit at the center thereof through which the ambient gas accumulated in said space is sucked into said hood.

16. The reflow apparatus of claim 14, wherein said hood has a lower end face at said suction opening, said lower end face is inclined relative to horizontal and said hood further comprises a pipe groove at said lower end face that allows liquid drops to run therein.

17. The reflow apparatus of claim 14, and further comprising a variable shutter for adjusting the width of said suction opening in accordance with the width of a printed circuit board in a direction of transfer of said transfer means.

18. The reflow apparatus of claim 14, and further comprising suction ducts located above and below a surface of a printed circuit board when transferred by said transfer means within said reflow furnace at said inlet and said outlet of said reflow furnace.

19. The reflow apparatus of claim 14, and further comprising a return port in said reflow furnace to which the ambient gas from said flux removing unit having components thereof removed is returned to return the ambient gas to said reflow furnace, said return port comprising a hood having a return opening and an interior space accommodating a plurality of straightening plates and forming a flow path for the ambient gas in said hood such that said return opening of said hood is divided into a plurality of sections that extend parallel to a transfer direction of said transfer means for guiding returning ambient gas in said hood, said straightening plates having adjustable intervals such that the velocity and amount of the ambient gas is freely adjustable when the ambient gas is returned to said reflow furnace.

20. The reflow apparatus of claim 9, and further comprising:

a plurality of slit plates located at said return opening of said hood reducing the size of said return opening, each of said slit plates having a space for accumulating the ambient gas and a slit at the center thereof through which the ambient gas accumulated in said space is returned to said reflow furnace;

a lower end face at said return opening of said hood, said lower end face being inclined relative to horizontal;

a pipe groove at said lower end face of said hood that allows liquid drops to run therein;

a variable shutter for adjusting the width of said return opening in accordance with the width of a printed circuit board in a direction of transfer of said transfer means; and suction ducts located above and below a surface of a printed circuit board when transferred by said transfer means within said reflow furnace at said inlet and said outlet of said reflow furnace.

* * * * *